March 5, 1957 — W. J. MENNE — 2,783,528
PROCESS FOR PRODUCING BEARINGS FOR MAINTAINING REVOLVING SHAFTS
Filed Sept. 2, 1952
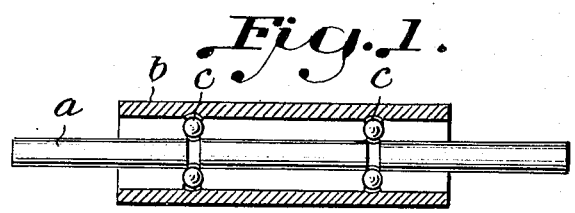
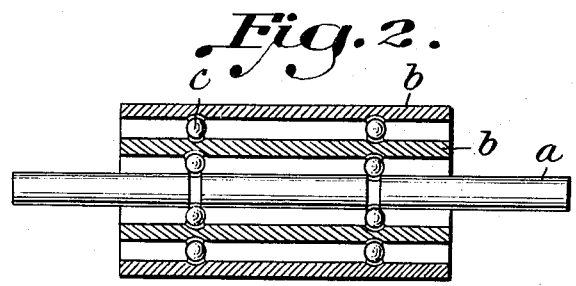
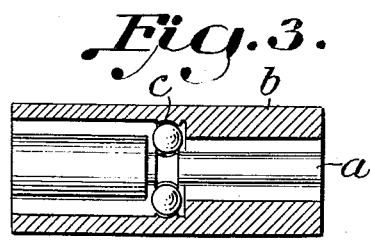
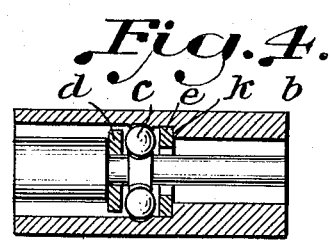
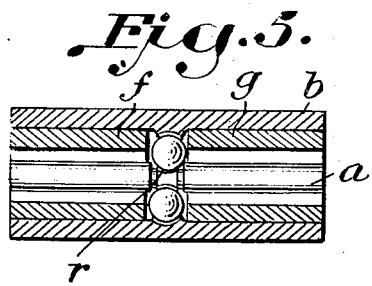
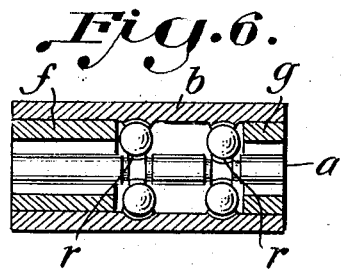
INVENTOR.
Wilhelm Johannes Menne

United States Patent Office 2,783,528
Patented Mar. 5, 1957

2,783,528

PROCESS FOR PRODUCING BEARINGS FOR MAINTAINING REVOLVING SHAFTS

Wilhelm Johannes Menne, Weil (Rhine), Germany, assignor to Guillaume Franck, Huningue (Haut Rhin), France Application September 2, 1952, Serial No. 307,538

Claims priority, application Germany September 3, 1951

2 Claims. (Cl. 29—148.4)

Patent application No. 184,404 of September 12, 1950, now Patent No. 2,719,765 granted October 4, 1955, relates to a process for producing bearings for maintaining revolving shafts in hollow cylindrical bodies, this process being characterized in that a hardened steel ball-ring $c$ seated in a groove in the shaft $a$ is forced into a cylinder $b$ of slightly smaller bore, and this ring is pushed into the desired position, the shaft then being compelled to turn with regard to the cylinder so that the balls, by rolling, make their own ball race in the wall of the cylinder, and this in such manner that, thanks to the concomitant effect of the raising of the metal of the border flange, a deep ball race is obtained for the balls.

The present invention has more particularly the purpose of proposing another method for obtaining the penetration of the balls $c$ of the ring into the cylinder $b$.

To this end, the present invention relates to a process for producing bearings for maintaining a shaft revolving in a hollow cylindrical body, this process being characterized in that one or more ball-rings surrounding this shaft and maintained in position on this shaft, are caused to penetrate into the internal wall of the hollow cylindrical body, by a shrinkage operation of this cylindrical body in such a manner that the balls in revolving make their own ball race, when the shaft is revolved in relation to the hollow body.

According to one characteristic of the invention, the shaft carrying the ball-rings maintained on this shaft is inserted in a hollow cylindrical body whose internal diameter is equal to the external diameter of the ball-ring, then the hollow body is shrunk at the same time that the shaft is revolved with regard to this hollow body, which enables the balls to make their own ball race.

The present invention also relates to a ball bearing characterized in that the ball-rings are axially checked by: (a) shoulders provided in the hollow body, (b) circular grooves hollowed out in the shaft.

According to one characteristic of the invention, hardened rings are inserted between the ball-rings and the checks so that no detrimental play occurs in the axial direction, even in the event of a load acting in jerks.

The present invention also relates to the characteristics hereinafter described and to their various possible combinations.

Ball bearings in accordance with the present invention are shown, by way of example, in the accompanying drawing, in which:

Figure 1 is an axial section view of a ball bearing produced by the process of the invention.

Figure 2 is an axial section view of a double-cylinder bearing and double ball-rings.

Figures 3 and 4 are axial section views of a bearing with axial check tubes.

Figure 5 is an axial sectional view of a bearing protected from axial strains at both sides, and Figure 6 is a similar view of a double ball-ring bearing.

According to the present invention, to cause the balls of the ball-ring $c$ to penetrate into the hollow cylindrical body $b$, this cylinder $b$ is shrunk after having engaged the shaft $a$ and the ball-rings $c$ surrounding this shaft $a$, in the interior of this cylinder.

The internal diameter of the hollow cylindrical body is selected so as to be the same as the external diameter of the ball-ring. The hollow body $b$ is slipped over the balls maintained on the shaft, by means of a suitable device, so as to bring this hollow body into the required position. Then the hollow body is shrunk, this shrinkage being sufficient for the balls to make their impression in the shaft as well as in the internal surface of the hollow body (Figure 1). By continually revolving the shaft, the shrinkage operation is continued until the required size is reached for the ball race surfaces as well as the intimate contact between the ball race and balls. After this shrinkage operation has been concluded, the hollow body dilates somewhat elastically, so that by regulating this operation in a suitable manner, the requisite play is obtained for the balls.

In many cases, it is advantageous to combine the press engaging operation, described in patent application No. 184,404 of September 12, 1950, now Patent No. 2,719,765 granted October 4, 1955, with the shrinkage operation. In this manner, for example, by introducing the ball-rings into the thin-walled hollow body by means of a press, the wall of the body is forced towards the outside. The hollow body can be recalibrated by means of a supplementary shrinkage. If, in order to enable it to accommodate the ball-rings, the shaft is provided with grooves (see Figures 1 and 2 of the Patent No. 2,719,765), the ball-rings can be made to penetrate by rolling, either by a press operation, or by a shrinkage operation, or by a combination of both operations.

Figure 2 shows another example of applying bearings in accordance with the present invention. In this case, the bearing comprises several cylinders inserted in each other and separated from each other by ball-rings.

If a bearing is subjected to a decided axial load, the method of achievement is selected from the kinds shown, for example, in Figures 3 or 4. The ball-ring is axially fixed, both by the collar of the shaft as well as the collar of the hollow cylindrical body. If required, hardened rings $d$ and $e$ can be inserted (Figure 4) between the ball-ring and an internal shoulder K of the hollow cylindrical body. In this manner, the bearing is protected on one side from strains of an axial kind which may occur. When the bearing is intended to be protected from such axial strains on both sides, the arrangement shown in Figure 5 or Figure 6 is selected. One of the ball-rings or both ball-rings are each seated in a groove $r$ provided in the shaft. In the hollow cylindrical body $b$, two tubes or rings $f$ and $g$ are fitted, their surfaces coming into contact with the balls being hardened, if required, so that even if the load is applied in jerks in the axial direction, there is no detrimental play.

The ball-rings can be made up of balls $c$ placed freely together or by balls fitted in a ball race.

For the balls to penetrate correctly, by rolling, into the shaft and the hollow body, it is necessary that the resistances which they encounter, in the shaft and in the hollow body, should be practically the same. Otherwise, the balls will tend to slip. But as for a ball diameter and a corresponding strain, the depth of penetration of the ball is dependent on the degree of hardness, there must be a suitable ratio between the degrees of hardness of the shaft and cylinder.

The conditions mentioned can be complied with by means of alloys, treatment processes, or else solely by a surface hardening. In the latter case, the depth of the hardened layer must be selected so as to obtain the requisite ball impression.

What I claim is:

1. A process for the manufacture of a ball bearing for supporting a rotating shaft comprising inserting a shaft having thereon a ball ring containing ball bearings freely into a hollow cylindrical body, then contracting said hollow body so that it will assume a definitive positioning with relation to said shaft and a penetration of the ball bearings of said ball ring into the metal of said hollow body and at the same time rotating said shaft during said contraction so that the ball bearings of said ball ring while penetrating into the metal of said hollow body form a continuous annular groove therein which constitutes a raceway for said ball bearings.

2. A process as set forth in claim 1 wherein said hollow body before contraction has an interior diameter equal to the exterior diameter of said ball ring containing said ball bearings located upon said shaft.

References Cited in the file of this patent

UNITED STATES PATENTS

| 881,471 | Hoffman | Mar. 10, 1908 |
| 1,176,170 | Schatz | Mar. 21, 1916 |
| 1,817,808 | Eaton | Aug. 4, 1931 |
| 2,112,754 | Annen | Mar. 29, 1938 |
| 2,223,799 | Annen | Dec. 3, 1940 |
| 2,536,821 | Rappl | Jan. 2, 1951 |
| 2,629,165 | Stillwagon | Feb. 4, 1953 |

FOREIGN PATENTS

| 382,500 | France | Feb. 7, 1908 |
| 552,180 | Great Britain | Mar. 25, 1943 |
| 617,991 | Great Britain | Feb. 15, 1949 |
| 801,548 | Germany | Jan. 11, 1951 |